United States Patent
Wilczynski et al.

(10) Patent No.: US 10,895,946 B2
(45) Date of Patent: Jan. 19, 2021

(54) SYSTEMS AND METHODS FOR USING TILED DATA

(71) Applicant: Palantir Technologies, Inc., Palo Alto, CA (US)

(72) Inventors: Peter Wilczynski, Palo Alto, CA (US); Daniel Cervelli, Mountain View, CA (US); Stephen Freiberg, Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/666,368

(22) Filed: Aug. 1, 2017

(65) Prior Publication Data

US 2018/0348961 A1   Dec. 6, 2018

Related U.S. Application Data

(60) Provisional application No. 62/512,640, filed on May 30, 2017.

(51) Int. Cl.
*G06F 3/0481* (2013.01)
*G06F 16/31* (2019.01)
(Continued)

(52) U.S. Cl.
CPC ............ *G06F 3/0481* (2013.01); *G06F 16/29* (2019.01); *G06F 16/322* (2019.01); *G06F 3/04842* (2013.01); *G06F 2203/04806* (2013.01)

(58) Field of Classification Search
CPC .............. G06T 17/05; G06F 17/30241; G06F 17/3028; G06F 17/30244; G06F 16/322; G06F 16/29
See application file for complete search history.

(56) References Cited

U.S. PATENT DOCUMENTS

| 4,899,161 A | 2/1990 | Morin et al. |
| 4,958,305 A | 9/1990 | Piazza |

(Continued)

FOREIGN PATENT DOCUMENTS

| AU | 2012216622 | 5/2015 |
| DE | 102013222023 | 1/2015 |

(Continued)

OTHER PUBLICATIONS

"A First Look: Predicting Market Demand for Food Retail using a Huff Analysis," TRF Policy Solutions, Jul. 2012, pp. 30.

(Continued)

*Primary Examiner* — Eric J Yoon
(74) *Attorney, Agent, or Firm* — Sheppard Mullin Richter & Hampton LLP

(57) ABSTRACT

Systems, methods, and non-transitory computer readable media are provided for using tiled data. An information request for an area may be received. Information for the area may be accessed. The information for the area may be stored in a tree structure such that the information is subdivided into one or more levels of tiles. Individual tiles may correspond to a portion of the area. One or more tiles may include precomputed information for the corresponding portion(s) of the area. A response to the information request may be determined based on the precomputed information.

18 Claims, 6 Drawing Sheets

(51) Int. Cl.
*G06F 16/29* (2019.01)
*G06F 3/0484* (2013.01)

(56) References Cited

U.S. PATENT DOCUMENTS

| | | |
|---|---|---|
| 5,329,108 A | 7/1994 | Lamoure |
| 5,754,182 A | 5/1998 | Kobayashi |
| 5,781,195 A | 7/1998 | Marvin |
| 5,781,704 A | 7/1998 | Rossmo |
| 6,091,956 A | 7/2000 | Hollenberg |
| 6,157,747 A | 12/2000 | Szeliski et al. |
| 6,169,552 B1 | 1/2001 | Endo et al. |
| 6,173,067 B1 | 1/2001 | Payton et al. |
| 6,178,432 B1 | 1/2001 | Cook et al. |
| 6,247,019 B1 | 6/2001 | Davies |
| 6,389,289 B1 | 5/2002 | Voce et al. |
| 6,414,683 B1 | 7/2002 | Gueziec |
| 6,483,509 B1 | 11/2002 | Rabenhorst |
| 6,529,900 B1 | 3/2003 | Patterson et al. |
| 6,631,496 B1 | 10/2003 | Li et al. |
| 6,662,103 B1 | 12/2003 | Skolnick et al. |
| 6,757,445 B1 | 6/2004 | Knopp |
| 6,828,920 B2 | 12/2004 | Owen et al. |
| 6,983,203 B1 | 1/2006 | Wako |
| 6,985,950 B1 | 1/2006 | Hanson et al. |
| 7,036,085 B2 | 4/2006 | Barros |
| 7,158,878 B2 | 1/2007 | Rasmussen et al. |
| 7,375,732 B2 | 5/2008 | Arcas |
| 7,379,811 B2 | 5/2008 | Rasmussen et al. |
| 7,457,706 B2 | 11/2008 | Malero et al. |
| 7,502,786 B2 | 3/2009 | Liu et al. |
| 7,519,470 B2 | 4/2009 | Brasche et al. |
| 7,529,195 B2 | 5/2009 | Gorman |
| 7,539,666 B2 | 5/2009 | Ashworth et al. |
| 7,558,677 B2 | 7/2009 | Jones |
| 7,574,428 B2 | 8/2009 | Leiserowitz et al. |
| 7,579,965 B2 | 8/2009 | Bucholz |
| 7,617,314 B1 | 11/2009 | Bansod et al. |
| 7,620,628 B2 | 11/2009 | Kapur et al. |
| 7,663,621 B1 | 2/2010 | Allen et al. |
| 7,791,616 B2 | 9/2010 | Ioup et al. |
| 7,805,457 B1 | 9/2010 | Viola et al. |
| 7,809,703 B2 | 10/2010 | Balabhadrapatruni et al. |
| 7,872,647 B2 | 1/2011 | Mayer et al. |
| 7,894,984 B2 | 2/2011 | Rasmussen et al. |
| 7,899,611 B2 | 3/2011 | Downs et al. |
| 7,920,963 B2 | 4/2011 | Jouline et al. |
| 7,945,852 B1 | 5/2011 | Pilskains |
| 7,962,281 B2 | 6/2011 | Rasmussen et al. |
| 7,970,240 B1 | 6/2011 | Chao et al. |
| 8,010,545 B2 | 8/2011 | Stefik et al. |
| 8,036,632 B1 | 10/2011 | Cona et al. |
| 8,065,080 B2 | 11/2011 | Koch |
| 8,085,268 B2 | 12/2011 | Carrino et al. |
| 8,134,457 B2 | 3/2012 | Velipasalar et al. |
| 8,145,703 B2 | 3/2012 | Frishert et al. |
| 8,200,676 B2 | 6/2012 | Frank |
| 8,214,361 B1 | 7/2012 | Sandler et al. |
| 8,214,764 B2 | 7/2012 | Gemmell et al. |
| 8,229,947 B2 | 7/2012 | Fujinaga |
| 8,230,333 B2 | 7/2012 | Decherd et al. |
| 8,290,942 B2 | 10/2012 | Jones et al. |
| 8,290,943 B2 | 10/2012 | Carbone et al. |
| 8,301,464 B1 | 10/2012 | Cave et al. |
| 8,325,178 B1 | 12/2012 | Doyle, Jr. |
| 8,368,695 B2 | 2/2013 | Howell et al. |
| 8,397,171 B2 | 3/2013 | Klassen et al. |
| 8,400,448 B1 | 3/2013 | Doyle, Jr. |
| 8,407,180 B1 | 3/2013 | Ramesh et al. |
| 8,412,234 B1 | 4/2013 | Gatmir-Motahari et al. |
| 8,412,707 B1 | 4/2013 | Mianji |
| 8,422,825 B1 | 4/2013 | Neophytou et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,508,533 B2 | 8/2013 | Cervelli et al. |
| 8,514,229 B2 | 8/2013 | Cervelli et al. |
| 8,515,207 B2 | 8/2013 | Chau |
| 8,564,596 B2 | 10/2013 | Carrino et al. |
| 8,742,934 B1 | 6/2014 | Sarpy et al. |
| 8,781,169 B2 | 7/2014 | Jackson et al. |
| 8,799,799 B1 | 8/2014 | Cervelli et al. |
| 8,830,322 B2 | 9/2014 | Nerayoff et al. |
| 8,938,686 B1 | 1/2015 | Erenrich et al. |
| 8,949,164 B1 | 2/2015 | Mohler |
| 8,983,494 B1 | 3/2015 | Onnen et al. |
| 9,009,177 B2 | 4/2015 | Zheng et al. |
| 9,021,384 B1 | 4/2015 | Beard et al. |
| 9,104,293 B1 | 8/2015 | Kornfeld et al. |
| 9,104,695 B1 | 8/2015 | Cervelli et al. |
| 9,111,380 B2 | 8/2015 | Piemonte et al. |
| 9,129,219 B1 | 9/2015 | Robertson et al. |
| 9,146,125 B2 | 9/2015 | Vulcano et al. |
| 9,235,906 B2 | 1/2016 | Carbonneau |
| 9,280,618 B1 | 3/2016 | Bruce et al. |
| 2002/0003539 A1 | 1/2002 | Abe |
| 2002/0033848 A1 | 3/2002 | Sciammarella et al. |
| 2002/0116120 A1 | 8/2002 | Ruiz et al. |
| 2002/0130867 A1 | 9/2002 | Yang et al. |
| 2002/0130906 A1 | 9/2002 | Miyaki |
| 2003/0052896 A1 | 3/2003 | Higgins et al. |
| 2003/0103049 A1 | 6/2003 | Kindratenko et al. |
| 2003/0144868 A1 | 7/2003 | MacIntyre et al. |
| 2003/0163352 A1 | 8/2003 | Surpin et al. |
| 2003/0225755 A1 | 12/2003 | Iwayama et al. |
| 2004/0030492 A1 | 2/2004 | Fox et al. |
| 2004/0039498 A1 | 2/2004 | Ollis et al. |
| 2004/0098236 A1 | 5/2004 | Mayer et al. |
| 2005/0031197 A1 | 2/2005 | Knopp |
| 2005/0034062 A1 | 2/2005 | Bufkin et al. |
| 2005/0080769 A1 | 4/2005 | Gemmell |
| 2005/0143602 A1 | 6/2005 | Yada et al. |
| 2005/0162523 A1 | 7/2005 | Darrell et al. |
| 2005/0182502 A1 | 8/2005 | Iyengar |
| 2005/0182793 A1 | 8/2005 | Keenan et al. |
| 2005/0223044 A1 | 10/2005 | Ashworth et al. |
| 2005/0267652 A1 | 12/2005 | Allstadt et al. |
| 2006/0026170 A1 | 2/2006 | Kreitler et al. |
| 2006/0139375 A1 | 6/2006 | Rasmussen et al. |
| 2006/0146050 A1 | 7/2006 | Yamauchi |
| 2006/0149596 A1 | 7/2006 | Surpin et al. |
| 2006/0200384 A1 | 9/2006 | Arutunian et al. |
| 2006/0251307 A1 | 11/2006 | Florin et al. |
| 2006/0259527 A1 | 11/2006 | Devarakonda et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0024620 A1 | 2/2007 | Muller-Fischer et al. |
| 2007/0057966 A1 | 3/2007 | Ohno et al. |
| 2007/0078832 A1 | 4/2007 | Ott et al. |
| 2007/0115373 A1 | 5/2007 | Gallagher et al. |
| 2007/0188516 A1 | 8/2007 | Loup et al. |
| 2007/0208497 A1 | 9/2007 | Downs et al. |
| 2007/0208498 A1 | 9/2007 | Barker et al. |
| 2007/0258642 A1 | 11/2007 | Thota |
| 2007/0294643 A1 | 12/2007 | Kyle |
| 2008/0010605 A1 | 1/2008 | Frank |
| 2008/0040684 A1 | 2/2008 | Crump |
| 2008/0077642 A1 | 3/2008 | Carbone et al. |
| 2008/0082578 A1 | 4/2008 | Hogue et al. |
| 2008/0098085 A1 | 4/2008 | Krane et al. |
| 2008/0104019 A1 | 5/2008 | Nath |
| 2008/0133579 A1 | 6/2008 | Lim |
| 2008/0163073 A1 | 7/2008 | Becker et al. |
| 2008/0192053 A1 | 8/2008 | Howell et al. |
| 2008/0195417 A1 | 8/2008 | Surpin et al. |
| 2008/0223834 A1 | 9/2008 | Griffiths et al. |
| 2008/0229056 A1 | 9/2008 | Agarwal et al. |
| 2008/0263468 A1 | 10/2008 | Cappione et al. |
| 2008/0267107 A1 | 10/2008 | Rosenberg |
| 2008/0270468 A1 | 10/2008 | Mao |

(56) References Cited

U.S. PATENT DOCUMENTS

| | | | |
|---|---|---|---|
| 2008/0278311 A1 | 11/2008 | Grange et al. |
| 2008/0288306 A1 | 11/2008 | MacIntyre et al. |
| 2008/0294678 A1 | 11/2008 | Gorman et al. |
| 2008/0301643 A1 | 12/2008 | Appleton et al. |
| 2009/0027418 A1 | 1/2009 | Maru et al. |
| 2009/0088964 A1 | 4/2009 | Schaaf et al. |
| 2009/0100018 A1 | 4/2009 | Roberts |
| 2009/0115786 A1 | 5/2009 | Shmiasaki et al. |
| 2009/0132921 A1 | 5/2009 | Hwangbo et al. |
| 2009/0132953 A1 | 5/2009 | Reed et al. |
| 2009/0144262 A1 | 6/2009 | White et al. |
| 2009/0158185 A1 | 6/2009 | Lacevic et al. |
| 2009/0171939 A1 | 7/2009 | Athsani et al. |
| 2009/0172511 A1 | 7/2009 | Decherd et al. |
| 2009/0179892 A1 | 7/2009 | Tsuda et al. |
| 2009/0187447 A1 | 7/2009 | Cheng et al. |
| 2009/0187464 A1 | 7/2009 | Bai et al. |
| 2009/0222400 A1 | 9/2009 | Kupershmidt et al. |
| 2009/0292626 A1 | 11/2009 | Oxford |
| 2009/0303251 A1* | 12/2009 | Balogh .............. G06F 17/30241 345/632 |
| 2010/0057716 A1 | 3/2010 | Stefik et al. |
| 2010/0063961 A1 | 3/2010 | Guiheneuf et al. |
| 2010/0070523 A1 | 3/2010 | Delgo et al. |
| 2010/0076968 A1 | 3/2010 | Boyns et al. |
| 2010/0106420 A1 | 4/2010 | Mattikalli et al. |
| 2010/0162176 A1 | 6/2010 | Dunton |
| 2010/0185692 A1 | 7/2010 | Zhang et al. |
| 2010/0198684 A1 | 8/2010 | Eraker et al. |
| 2010/0199225 A1 | 8/2010 | Coleman et al. |
| 2010/0277611 A1 | 11/2010 | Holt et al. |
| 2010/0293174 A1 | 11/2010 | Bennett et al. |
| 2010/0321399 A1 | 12/2010 | Ellren et al. |
| 2011/0022312 A1 | 1/2011 | McDonough et al. |
| 2011/0090254 A1 | 4/2011 | Carrino et al. |
| 2011/0117878 A1 | 5/2011 | Barash et al. |
| 2011/0137766 A1 | 6/2011 | Rasmussen et al. |
| 2011/0153368 A1 | 6/2011 | Pierre et al. |
| 2011/0161096 A1 | 6/2011 | Buehler et al. |
| 2011/0170799 A1 | 7/2011 | Carrino et al. |
| 2011/0208724 A1 | 8/2011 | Jones et al. |
| 2011/0218934 A1 | 9/2011 | Elser |
| 2011/0225198 A1 | 9/2011 | Edwards et al. |
| 2011/0238690 A1 | 9/2011 | Arrasvuori et al. |
| 2011/0270705 A1 | 11/2011 | Parker |
| 2012/0066296 A1 | 3/2012 | Appleton et al. |
| 2012/0084118 A1 | 4/2012 | Bai et al. |
| 2012/0106801 A1 | 5/2012 | Jackson |
| 2012/0144335 A1 | 6/2012 | Abeln et al. |
| 2012/0158527 A1 | 6/2012 | Cannelongo et al. |
| 2012/0159363 A1 | 6/2012 | DeBacker et al. |
| 2012/0173985 A1 | 7/2012 | Peppel |
| 2012/0206469 A1 | 8/2012 | Hulubei et al. |
| 2012/0208636 A1 | 8/2012 | Feige |
| 2012/0221580 A1 | 8/2012 | Barney |
| 2012/0323888 A1 | 12/2012 | Osann, Jr. |
| 2013/0006725 A1 | 1/2013 | Simanek et al. |
| 2013/0021445 A1 | 1/2013 | Cossette-Pacheco et al. |
| 2013/0057551 A1 | 3/2013 | Ebert et al. |
| 2013/0060786 A1 | 3/2013 | Serrano et al. |
| 2013/0073377 A1 | 3/2013 | Heath |
| 2013/0076732 A1 | 3/2013 | Cervelli et al. |
| 2013/0100134 A1 | 4/2013 | Cervelli et al. |
| 2013/0101159 A1 | 4/2013 | Chao et al. |
| 2013/0132398 A1 | 5/2013 | Pfiefle |
| 2013/0150004 A1 | 6/2013 | Rosen |
| 2013/0176321 A1 | 7/2013 | Mitchell et al. |
| 2013/0179420 A1 | 7/2013 | Park et al. |
| 2013/0254900 A1 | 9/2013 | Sathish et al. |
| 2013/0268520 A1 | 10/2013 | Fisher et al. |
| 2013/0279757 A1 | 10/2013 | Kephart |
| 2013/0282723 A1 | 10/2013 | Petersen et al. |
| 2013/0339891 A1 | 12/2013 | Blumenberg et al. |
| 2014/0108419 A1* | 4/2014 | Udeshi .............. G06F 17/30241 707/743 |
| 2014/0176606 A1 | 6/2014 | Narayan et al. |
| 2014/0218400 A1 | 8/2014 | O'Toole et al. |
| 2014/0333651 A1* | 11/2014 | Cervelli ................ G06F 3/0481 345/589 |
| 2014/0337772 A1 | 11/2014 | Cervelli et al. |
| 2014/0361899 A1 | 12/2014 | Layson |
| 2015/0029176 A1 | 1/2015 | Baxter et al. |
| 2015/0100907 A1 | 4/2015 | Erenrich et al. |
| 2015/0106170 A1 | 4/2015 | Bonica |
| 2015/0186821 A1 | 7/2015 | Wang et al. |
| 2015/0187036 A1 | 7/2015 | Wang et al. |
| 2015/0187100 A1 | 7/2015 | Berry et al. |
| 2015/0312323 A1 | 10/2015 | Peterson |
| 2015/0338233 A1 | 11/2015 | Cervelli et al. |
| 2015/0370828 A1* | 12/2015 | Maurer .................. H04L 67/02 707/722 |
| 2015/0371430 A1* | 12/2015 | Brewington ............ G06T 17/05 345/428 |
| 2015/0379413 A1 | 12/2015 | Robertson et al. |

FOREIGN PATENT DOCUMENTS

| | | |
|---|---|---|
| EP | 0 763 201 | 3/1997 |
| EP | 2 575 107 | 4/2013 |
| EP | 2858014 | 4/2015 |
| EP | 2963595 | 1/2016 |
| GB | 2516155 | 1/2015 |
| NL | 2012778 | 11/2014 |
| NZ | 624557 | 12/2014 |
| WO | WO 95/032424 | 11/1995 |
| WO | WO 2000/009529 | 2/2000 |
| WO | WO 2001/098925 | 12/2001 |
| WO | WO 2004/057268 | 7/2004 |
| WO | WO 2005/013200 | 2/2005 |
| WO | WO 2008/064207 | 5/2008 |
| WO | WO 2009/061501 | 5/2009 |
| WO | WO 2009/123975 | 10/2009 |
| WO | WO 2011/058507 | 5/2011 |

OTHER PUBLICATIONS

"Andy Turner's GISRUK 2012 Notes" <https://docs.google.com/document/d/1cTmxg7mVx5gd89lqblCYvCEnHA4QAivH4l4WpyPsqE4/edit?pli=1> printed Sep. 16, 2013 in 15 pages.

"HunchLab: Heat Map and Kernel Density Calculation for Crime Analysis," Azavea Journal, printed from www.azavea.com/blogs/newsletter/v4i4/kernel-density-capabilities-added-to-hunchlab/ on 9 Sep. 2014, 2 pages.

Barnes et al., "Viewshed Analysis", GIS-ARC/Info 2001, <www.evsc.virginia.edu/~jhp73/evsc466/student_pres/Rounds.pdf>.

Carver et al., "Real-Time Visibility Analysis and Rapid Viewshed Calculation Using a Voxel-Based Modelling Approach," GISRUK 2012 Conference, Apr. 11-13, Lancaster UK, Apr. 13, 2012, pp. 6.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

Definition "Identify", downloaded Jan. 22, 2015, 1 page.

Definition "Overlay", downloaded Jan. 22, 2015, 1 page.

Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.

Ghosh, P., "A Solution of Polygon Containment, Spatial Planning, and Other Related Problems Using Minkowski Operations," Computer Vision, Graphics, and Image Processing, 1990, vol. 49, pp. 1-35.

GIS-NET 3 Public _ Department of Regional Planning. Planning & Zoning Information for UNICORPORATED LA County. Retrieved Oct. 2, 2013 from http://gis.planning.lacounty.gov/GIS-NET3_Public/Viewer.html.

Gorr et al., "Crime Hot Spot Forecasting: Modeling and Comparative Evaluation", Grant 98-IJ-CX-K005, May 6, 2002, 37 pages.

(56) References Cited

OTHER PUBLICATIONS

Griffith, Daniel A., "A Generalized Huff Model," Geographical Analysis, Apr. 1982, vol. 14, No. 2, pp. 135-144.
Haralick et al., "Image Analysis Using Mathematical Morphology," Pattern Analysis and Machine Intelligence, IEEE Transactions, Jul. 1987, vol. PAMI-9, No. 4, pp. 532-550.
Hibbert et al., "Prediction of Shopping Behavior Using a Huff Model Within a GIS Framework," Healthy Eating in Context, Mar. 18, 2011, pp. 16.
Huang et al., "Systematic and Integrative Analysis of Large Gene Lists Using David Bioinformatics Resources," Nature Protocols, 4.1, 2008, 44-57.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Ipbucker, C., "Inverse Transformation for Several Pseudo-cylindrical Map Projections Using Jacobian Matrix," ICCSA 2009, Part 1 LNCS 5592, pp. 553-564.
Levine, N., "Crime Mapping and the Crimestat Program," Geographical Analysis, 2006, vol. 38, pp. 41-56.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Mandagere, Nagapramod, "Buffer Operations in GIS," <http://www-users.cs.umn.edu/~npramod/enc_pdf.pdf> retrieved Jan. 28, 2010, pp. 7.
Map Builder, "Rapid Mashup Development Tool for Google and Yahoo Maps!" <http://web.archive.org/web/20090626224734/http://www.mapbuilder.net/> printed Jul. 20, 2012 in 2 pages.
Map of San Jose, CA. Retrieved Oct. 2, 2013 from http://maps.yahoo.com.
Map of San Jose, Ca. Retrieved Oct. 2, 2013 from http://maps.bing.com.
Map of San Jose, CA. Retrieved Oct. 2, 2013 from http://maps.google.com.
Murray, C., Oracle Spatial Developer's Guide—6 Coordinate Systems (Spatial Reference Systems), <http://docs.oracle.com/cd/B28359_01/appdev.111/b28400.pdf>, Jun. 2009.
Open Street Map, "Amm's Diary:Unconnected ways and other data quality issues," http://www.openstreetmap.org/user/amm/diary printed Jul. 23, 2012 in 3 pages.
Poi Editor, "How to: Create Your Own Points of Interest," <http://www.poieditor.com/articles/how_to__create_your_own_points_of_interest/> printed Jul. 22, 2012 in 4 pages.
Pozzi et al., "Vegetation and Population Density in Urban and Suburban Areas in the U.S.A." Third International Symposium of Remote Sensing of Urban Areas Istanbul, Turkey, Jun. 2002, pp. 8.
Qiu, Fang, "3d Analysis and Surface Modeling", <http://web.archive.org/web/20091202221925/http://www.utsa.edu/lrsg/Teaching/EES6513/08-3D.pdf> printed Sep. 16, 2013 in 26 pages.

Reddy et al., "Under the hood of GeoVRML 1.0," SRI International, Proceedings of the fifth symposium on Vurtual Reality Modeling Language (Web3D-VRML), New York, NY, Feb. 2000, pp. 23-28. <http://pdf.aminer.org/000/648/038/under_the_hood_of_geovrml.pdf>.
Reibel et al., "Areal Interpolation of Population Counts Using Pre-classi_ed Land Cover Data," Population Research and Policy Review, 2007, vol. 26, pp. 619-633.
Reibel, M., "Geographic Information Systems and Spatial Data Processing in Demography: a Review," Population Research and Policy Review, 2007, vol. 26, pp. 601-618.
Rizzardi et al., "Interfacing U.S. Census Map Files with Statistical Graphics Software: Application and Use in Epidemiology," Statistics in Medicine, Oct. 1993, vol. 12, No. 19-20, pp. 1953-1964.
Snyder, "Map Projections—A Working Manual," U.S. Geological Survey Professional paper 1395, United States Government Printing Office, Washington: 1987, pp. 11-21 and 60-70.
Sonris, "Using the Area of Interest Tools," <http://web.archive.org/web/20061001053327/http://sonris-www.dnr.state.la.us/gis/instruct_files/tutslide12> printed Jan. 3, 2013 in 1 page.
Tangelder et al., "Freeform Shape Matching Using Minkowski Operations," The Netherlands, Jun. 1996, pp. 12.
Thompson, Mick, "Getting Started with GEO," Getting Started with GEO, Jul. 26, 2011.
Valentini et al., "Ensembles of Learning Machines", M. Marinaro and R. Tagliaferri (Eds.): Wirn Vietri 2002, LNCS 2486, pp. 3-20.
VB Forums, "Buffer A Polygon," Internet Citation, <http://www.vbforums.com/showthread.php?198436-Buffer-a-Polygon>, Specifically Thread #1, #5 & #11 retrieved on May 2, 2013, pp. 8.
Vivid Solutions, "JTS Topology Suite: Technical Specifications," <http://www.vividsolutions.com/jts/bin/JTS%20Technical%20Specs.pdf> Version 1.4, 2003, pp. 36.
Wikipedia, "Douglas_Peucker-Algorithms," <http://de.wikipedia.org/w/index.php?title=Douglas-Peucker-Algorithmus&oldid=91846042> printed Jul. 2011, pp. 2.
Wikipedia, "Ramer_Douglas_Peucker Algorithm," <http://en.wikipedia.org/wiki/Ramer%E2%80%93Douglas%E2%80%93Peucker_algorithm> printed Jul. 2011, pp. 3.
Wongsuphasawat et al., "Visual Analytics for Transportation Incident Data Sets," Transportation Research Record 2138, 2009, pp. 135-145.
Woodbridge, Stephen, "[geos-devel] Polygon simplification," <http://lists.osgeo.org/pipermail/geos-devel/2011-May/005210.html> dated May 8, 2011, pp. 3.
Extended European Search Report for EP Appln. No. 18174764.3 dated Jul. 19, 2018, 8 pages.
Official Communication for EP Appln. No. 18174764.3 dated Feb. 6, 2020, 6 pages.
Podlipnig et al., A survey of Web cache replacement strategies, ACM Computing Surveys, ACM, New York, NY, vol. 35, No. 4, 2003, pp. 374-398.

* cited by examiner

SYSTEMS AND METHODS FOR USING TILED DATA

CROSS REFERENCE TO RELATED APPLICATIONS

This application claims the benefit under 35 U.S.C. § 119(e) of the U.S. Provisional Application Ser. No. 62/512,640, filed May 30, 2017, the content of which is hereby incorporated by reference in its entirety.

FIELD OF THE INVENTION

This disclosure relates to approaches for using tiled data for computation and presentation.

BACKGROUND

Under conventional approaches, data may be aggregated for computation/presentation. As the amount of data becomes larger, costs (e.g., time, memory, processing) of performing operations on the data may become prohibitively expensive. For example, sharding of data into multiple data shards may introduce delays/latencies into the processing flow when data in multiple data shards are required for computation. Providing efficient access to data may reduce memory and processing load on computing systems (e.g., servers).

SUMMARY

Various embodiments of the present disclosure may include systems, methods, and non-transitory computer readable media configured to use tiled data. Various embodiments of the present disclosure may include systems, methods, and non-transitory computer readable media configured to receive an information request for an area. Information for the area may be accessed. The information for the area may be stored in a tree structure such that the information is subdivided into one or more levels of tiles. Individual tiles may correspond to a portion of the area. One or more tiles may include precomputed information for the corresponding portion(s) of the area. A response to the information request may be determined based on the precomputed information.

In some embodiments, the information may be subdivided based on a quadtree structure.

In some embodiments, the systems, methods, and non-transitory computer readable media are configured to determine that a first tile does not include first precomputed information for a first portion of the area corresponding to the first tile. In response to the determination that the first tile does not include the first precomputed information, the first precomputed information may be recursively determined based on the information subdivided in sub-tiles of the first tile. The first precomputed information may be cached.

In some embodiments, the information request for the area may be received through a user interface. The user interface may enable a user selection of one or more tiles corresponding to the area.

In some embodiments, the user interface may enable changes in zoom levels. Individual zoom levels may correspond to individual levels of tiles.

In some embodiments, the response may include a histogram for the area.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
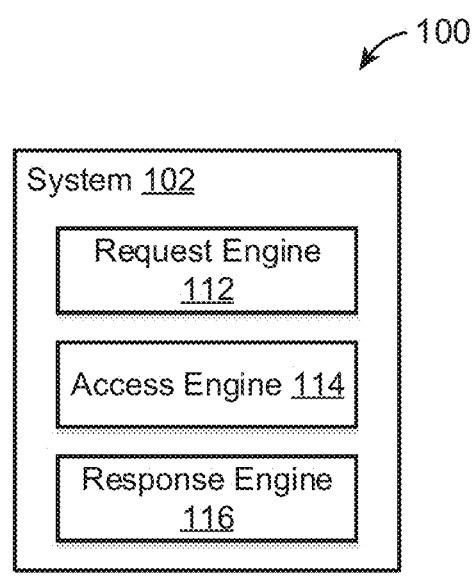
FIG. 1 illustrates an example environment for using tiled data, in accordance with various embodiments.

A claimed solution rooted in computer technology overcomes problems specifically arising in the realm of computer technology. In various implementations, a computing system may receive an information request for an area. An area may refer to a geographical area or a grouping of information (conceptually projected onto a plane). The request may be received, for example, via a user's selection of the area through a user interface. The user interface may enable a user selection of one or more tiles corresponding to the area and/or enable changes in zoom levels to change the size of individual tiles available for selection. The computing system may access information for the area. The information for the area may be stored in a tree structure such that the information is subdivided into one or more levels of tiles. In some embodiments, the information may be subdivided based on a quadtree structure. One or more tiles may include precomputed information for the portion(s) of the area corresponding to the tile(s). The computing system may determine a response to the information request based on the precomputed information and/or other information. The response may include one or more histograms for the area.

In some embodiments, the computing system may determine that a given tile does not include precomputed information for the portion of the area corresponding to the given tile. The computing system may recursively determine the information for the given tile based on the information subdivided in sub-tiles of the given tile. The determined information for the given tile may be cached (e.g., in permanent/temporary memory) as precomputed information. Subdividing information into tiles may enable the computing system to perform computations of the information in parallel. The use of precomputed information may enable the computing system to quickly provide information regarding the area (e.g., by finding answers to questions based on previously cached answers to the same or overlapping questions).

In some embodiments, the computing system may increase the precision of the information request. The computing system may request a larger number of sub-tiles in order to increase precision. The computing system may perform this optimization automatically, asynchronously, or in response to user input.

As used herein, the term "area" may refer to a definable extent. An area may refer to an extent definable in the physical world (e.g., geographical area) or an extent definable for information (e.g., grouping of information). For example, an area may refer to a particular geographical area of the world, a country, a state, or other regions. An area may refer to a particular grouping of information (conceptually projected onto a plane) based on type, subject, topic, and/or other grouping of information. While the disclosure is described herein with respect to information relating to geographical areas (e.g., displayed on a map), there is merely for illustrative purposes and is not meant to be limiting.

The approach disclosed herein enables efficient computation/presentation of data using tiles. Information for different areas may be stored using a hierarchy of tiles. The use of tiles allows the computing system to process information within tiles in parallel and provides for a scalable infrastructure that can efficiently process data for large areas. Information for individual tiles may be determined recursively using information within sub-tiles. Determined information may be cached in memory to be used as precomputed information. One or more tiles may include precomputed information (e.g., cached in permanent and/or temporary memory), and precomputed information may be used (e.g., merged) with other information to quickly provide responses to information requests. For example, a user may request information regarding a geographic area on a map. Information regarding individual areas of the map may be stored using one or more levels of tiles (e.g., using a quadtree structure). A response to an information request for the area may be determined by merging precomputed information stored in the tiles/sub-tiles corresponding to the area. The response may be presented within one or more histograms.

Rather than re-computing/reprocessing data for individual information requests, the approach disclosed herein provides for use of cached information in tiles that enables both scaling and parallelization of information processing. Accuracy of the response may depend on the level of tiles used to determine the response (e.g., use of information in smaller tiles may result in more accurate response). The use of tiles/precomputed information enables reduction in processing time even when the precomputed information may not directly answer the information request. Overlaps between precomputed information and the information request may allow for simplified determination of the response by decomposing the information request into Boolean logics and using the precomputed information as part of the Boolean logic.

FIG. 1 illustrates an example environment 100 for using tiled data, in accordance with various embodiments. The example environment 100 may include a computing system 102. The computing system 102 may include one or more processors and memory. The processor(s) may be configured to perform various operations by interpreting machine-readable instructions stored in the memory. As shown in FIG. 1, in various embodiments, the computing device 102 may include a request engine 112, an access engine 114, a response engine 116, and/or other engines.

In various embodiments, the request engine 112 is configured to receive an information request for an area. The information request may be received directly at the computing system 102 (e.g., received from a user using the computing system 102) or received from another computing device (e.g., received from a user using a computing device that communicates with the computing system 102). The information request for an area may specify one or more particular areas and one or more desired information for the area(s). For example, an information request may specify a particular geographical region and the desired information about the geographical region. An information request may be received at once or in multiple parts. For example, the request engine 112 may receive an information request specifying both the area and the desired information in a single communication. The request engine 112 may receive an information request in parts—for example, a first communication may specify a particular area and a second communication may specify the desired information for the particular area. Other arrangements/structures of information requests are contemplated.

In some embodiments, an information request for an area may be received through a user interface. The user interface may display a map of a geographic area and may enable a user to select a particular region within the map as the area for which information is desired. The user interface may display one or more options from which a user may select particular information (e.g., type of information displayed in a histogram) desired for the selected area.

The user interface may enable a user to select (e.g., via a drawing tool, via a mouse click, via a key entry) the area for which information is desired. Information for the area may be subdivided into one or more levels of tiles representing portions of the area. The user interface may enable a user to select one or more tiles corresponding to the area. One or more tiles may include precomputed information for the corresponding portion(s) of the area. For example, the user interface may enable a user to draw a box to select a particular area shown on a map. The box selection may select tiles entirely and/or partially within the box. Other selections of areas/tiles are contemplated.

In some embodiments, the user interface may enable changes in zoom levels. Zoom levels may define the extent of the map and/or tiles shown in the user interface. Zoom levels may define the levels of tiles used for computation. Individual zoom levels may correspond to individual levels of tiles. For example, information regarding an area may be subdivided into multiple levels of tiles. The zoom level with the smallest magnification (showing the largest extent of the map) may correspond to the highest level of the tiles (tile(s) individually corresponding to largest portions of the area), while the zoom level with the largest magnification (showing the smallest extent of the map) may correspond to the lowest level of the tiles (tile(s) individually corresponding smallest portions of the area). Other correspondence between zoom levels and tile levels are contemplated. A user may change the zoom level to change the levels of tiles available for selection. In some embodiments, the user interface may include other options (e.g., enhance button) to change the level of tiles selectable/usable for computation. Tying the levels of tiles selectable/usable for computation to zoom levels may allow the user to change the type (e.g., accuracy) of the information retrieved about an area based on the zoom level used to view the area. For example, a user using the user interface to view a zoomed-out view of an area may be shown information that is more approximated than a user using the user interview to view a zoomed-in view of the area.

In various embodiments, the access engine 114 is configured to access information for an area. Information for the area may be accessed from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). The information for the area may be stored in one or more databases. The information for the area may be stored within a single file or across multiple files.

The information for the area may be stored in a tree structure such that the information is subdivided into one or more levels of tiles. Individual tiles may correspond to a portion of the area. For example, information for a particular area selected by a user may be included within one or more tiles of a first level (first level tiles). Different first level tiles may correspond to different portions of the area. The portions of the area corresponding to first level tiles may be of the same size and/or dimension. Tiles at a higher zoom level may represent a larger geographic area than sub-tiles at a lower zoom level. Tiles may be identified by their location in a projected coordinate scheme according to {z, x, y}. For example, a geographical area selected by a user may include two first level tiles of a square shape. The information for the area may be divided among the two first level tiles based on the portions of the area to which the individual first level tiles correspond. Other numbers and shapes of tiles are contemplated.

Individual first level tiles may be subdivided into tiles of a second level (second level tiles). Different second level tiles may correspond to different portions of the area smaller than the portions of the area corresponding to the first level tiles. For example, the information may be subdivided based on a quadtree structure such that information of individual tiles are subdivided into four square sub-tiles. Information for a portion of an area corresponding to a first level tile may be divided among four second level tiles. Individual second level tiles may include a portion of the information based on the portion of the area to which the second level tiles correspond. Other numbers and shapes of sub-tiles are contemplated. Additional levels of tiles (e.g., individual second level tiles subdivided into tiles of a third level, and so forth) are contemplated.

The levels of the tiles may be subdivided to form a hierarchy of tiles. Information stored in different tiles/different levels of tiles may be used for computation in response to information requests. One or more tiles may include precomputed information for corresponding portion(s) of the area. Precomputed information may refer to information that has been previously determined (e.g., based on information requests) and stored in memory. Precomputed information may be used to efficiently provide responses to information requests. The level of tiles from which information are used may depend on a user selection (e.g., zoom level, enhancement option, precision requirements).

Individual tiles may correspond to a portion of an area projected on a map. In some embodiments, the projection scheme for the tiles may match the projection scheme used for a map. For example, the same projection used to project the world (sphere) to a two-dimensional plane (e.g., Web Mercator, EPSG:3857) may be used for the tiles. The tiles may be generated according to arbitrary geospatial projections. Using the projection scheme used for the map for the tiles may simplify the translation of the information contained within the tiles to a projected tile space.

In various embodiments, the response engine 116 is configured to determine a response to the information request based on at least the precomputed information and/or other information. Determining responses to information requests may include one or more operations on the information contained within tiles of the selected area. For example, responsive to an information request for a particular area, the response engine 116 may operate on the information contained within the tiles/sub-tiles of the particular area to determine the responsive information. Operations on the information may include aggregating, joining, determining maximum/minimum, filtering, determining distribution, determining average, and/or other operations on the information. The response engine 116 may be configured to change the accuracy of the response based on the levels of tiles used to determine the response (e.g., via a change in a zoom level or use of an enhancement option).

The response to the information request may be determined based on precomputed information within the tiles/sub-tiles. For example, an information request may be seeking information on the numbers of fire hydrants within a particular geographical area. The particular geographical area may be included with two first level tiles: tile A and tile B. The tiles A and B may divide the geographical area into a portion A and a portion B. Individual first level tiles may be sub-divided into four second level tiles: sub-tiles A1, A2, A3, A4; sub-tiles B1, B2, B3, B4. The tile A may include precomputed information regarding the number of fire hydrants within the portion of the area corresponding to the tile A (portion A). The response engine 116 may determine a part of the response to the information request by using the precomputed information included in the tile A.

The response engine 116 may be configured to determine that a given tile does not include precomputed information for a given portion of the area corresponding to the given tile. In response to the determination that the given tile does not include the precomputed information, the information may be recursively determined based on the information subdivided in sub-tiles of the given tile. The determined information may be cached as the precomputed information for the given tile. For example, referring to the example above regarding tiles A and B, the tile B may not include precomputed information regarding the number of fire hydrants within the portion of the area corresponding to the tile B (portion B). The response engine 116 may determine the information on the number of fire hydrants within the tile B by recursively using information within the sub-tiles B1, B2, B3, B4.

In some embodiments, one or more of the sub-tiles B1, B2, B3, B4 may include precomputed information regarding the number of fire hydrants within the portion of the area corresponding to the sub-tiles B1, B2, B3, B4. For example, all sub-tiles B1, B2, B3, B4 may include the needed precomputed information and the information for the tile B may be determined by summing the precomputed information within the sub-tiles B1, B2, B3, B4. Based on one or more of the sub-tiles B1, B2, B3, B4 not including the needed precomputed information, the response engine 116 may determine the information for the individual sub-tiles.

In some embodiments, the sub-tiles may be further subdivided and the response engine 116 may use the information within the smaller sub-tiles. In some embodiments, the sub-tiles may be base sub-tiles (not further sub-divided), and the response engine 116 may use the underlying data associated with the base sub-tiles (e.g., information within one or more databases that corresponds to the latitude and longitude of the sub-tiles) to determine the needed information. Thus, the information for the tiles (e.g., tileset) may be built up recursively based on the underlying data and precomputed information for individual tiles. Because the information is built up recursively, determining a response to an information request may enable the response engine 116 to determine the appropriate information within individual tiles and store the information as precomputed information for the tiles.

Determined information for the tiles may be stored as precomputed information for the corresponding tiles. For example, determined information may be stored in one or more datastores that maps a given tile (e.g., via tile ID) to one or more tables or one or more locations within one or more tables. In some embodiments, the precomputed information may be stored as cache of tiles located in optimized locations for read by the computing system 102. The cached information may be stored in permanent memory and/or in temporary memory (e.g., as a collection of answers to recently requested information). In some embodiments, the determined information for individual tiles may be stored as precomputed information based on the frequency of the request to which the information is responsive and/or based on the cost (e.g., time, processing) required to determine the information.

In some embodiments, the location of the information storage (in permanent vs temporary memory) may depend on the type of information. For example, for geospatial data, certain types of data may be generally persisted in permanent memory. For example, count of objects within a geographical area may be stored in permanent memory for the tiles/sub-tiles, while properties relating to the objects may be stored in temporary memory.

In some embodiments, information within a given tile may be null data—that is there may be no data corresponding to the particular portion of the area corresponding to the given tile. For example, referring to the example above regarding sub-tiles B1, B2, B3, B4, the sub-tile B4 may not include any fire hydrants (e.g., the portion of the area corresponding to the sub-tile B4 may be a location, such as a lake, where fire hydrants do not exist). Rather than storing a zero value in a database or caching the zero value as precomputed information, a single null data set may be used to represent multiple null data in the tiles. For example, the sub-tile B4 may point to a null data set that is shared among other tiles when they have null data for particular information requests.

In some embodiments, information within a given tile may change. For example, referring to the example above regarding sub-tiles B1, B2, B3, B4, the sub-tile B4 may include newly built fire hydrants which are not yet reflected in the pre-computed tile information. Rather than have the system be offline or otherwise unavailable to rebuild the full tileset, Tile B may be marked as dirty. The system would then rebuild the tiles recursively in response to user information requests. In some embodiments, the system may also rebuild dirty tiles automatically in the background according to various heuristics (e.g., historical frequency of user information requests).

The division of information into tiles may enable the response engine 116 to quickly provide information regarding an area by performing computations in parallel. For example, the computations for the sub-tiles B1, B2, B3, B4 may be performed in parallel, rather than serially. Additionally, the use of precomputed information (cached in memory) may provide additional speed-ups to the computing system 104 in processing/computing responses to information requests. In some embodiments, the response to the information may include an approximate answer (e.g., answer provided with a given accuracy) or a range of answers (e.g., answer provided with a minimum and/or a maximum).

In some embodiments, the response engine 116 may be configured to use overlapping precomputed information to efficiently determine a response to an information request. An overlapping precomputed information may refer to an information, cached in a tile, which does not directly respond to an information request but allows the response engine 116 to simplify the determination of the response. For example, an information request may specify as desired information a number of firefighters stationed within a particular geographic area. A tile corresponding to a portion of the area may not include precomputed information about the number of firefighters stationed with the portion of the area, but may include overlapping precomputed information that the number of fire stations within the portion of the area is zero. Based on the overlapping precomputed information, the response engine 116 may determine (e.g., via Boolean logic) that the number of firefighters stationed within the portion of the area is zero (because there are no fire stations within the portion of the area) without further analysis of the data underlying the tile.

In some embodiments, the response determined by the response engine 116 may include one or more histograms for the area. A histogram for the area may display one or more statistical information regarding the number/frequency of certain objects/data/properties within the area. The histogram may be generated based on one or more precomputed information for tile(s) corresponding to the area. In some embodiments, the histogram may be generated after a user's selection of an area, rather than while the user is selecting an area. Generating the histogram during a user's selection of the area may result in the response engine 116 utilizing the processing capabilities of the computing system 102 to determine information for tiles that are not needed for the finally selected area. For example, as a user is selecting a given area, the user's selection may momentarily cover undesired areas. Generating the histogram during the user's selection of the area may result in the response engine 116 determining information within the undesired areas and needlessly consuming resources. Generating the histogram after the user's selection of the area may enable the response engine 116 to reduce the load on the computing system 102 by computing information on only the tiles that are needed to respond to the information request.

Figure 2A:
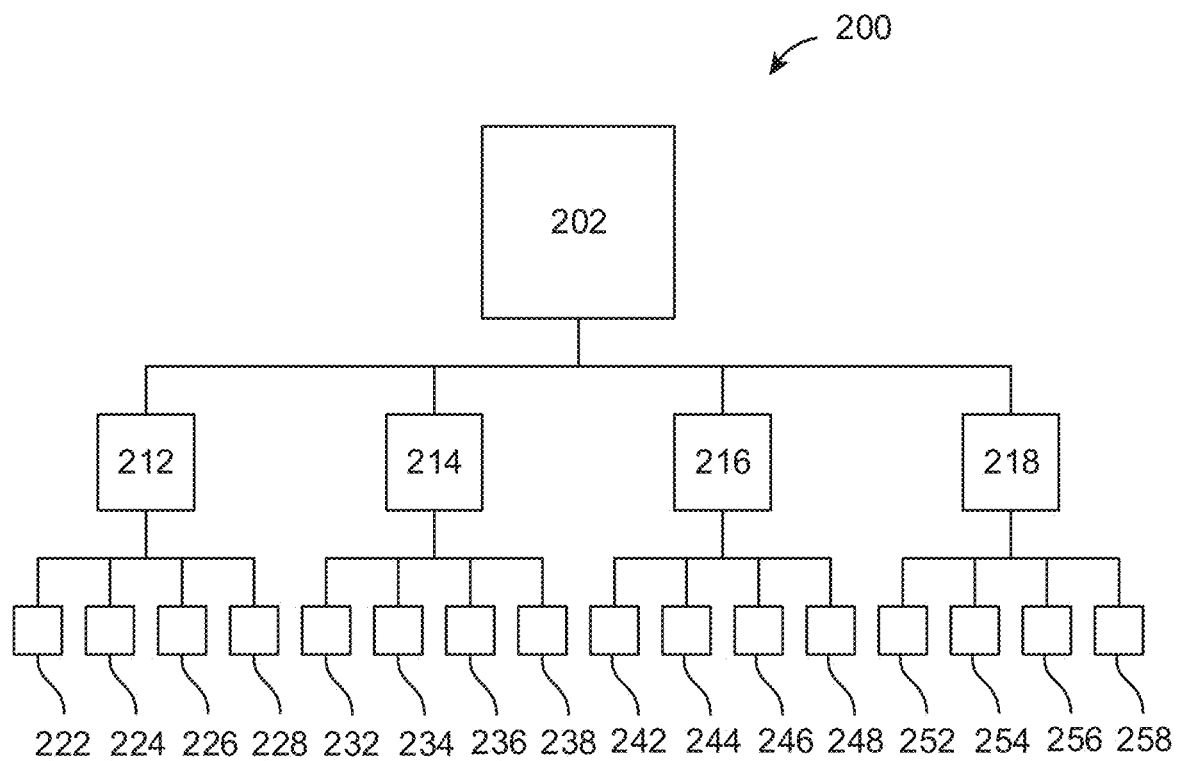
FIGS. 2A-B illustrate example representations of tiled data, in accordance with various embodiments.

FIG. 2A illustrates an example representation 200 of tiled data, in accordance with various embodiments. The representation 200 may include three levels of tiles. The first level of tiles may include a tile 202. The tile 202 may correspond to an area (e.g., geographical area) and may include information (e.g., cached precomputed information) about the area. Information about the area may be subdivided into four second level tiles 212, 214, 216, 218. The second level tiles 212, 214, 216, 218 may correspond to four smaller portions of the area represented by the tile 202 (e.g., upper left portion, upper right portion, lower left portion, lower right portion). The second level tiles 212, 214, 216, 218 may be of same size/dimension. The tiles 212, 214, 216, 218 may include information (e.g., cached precomputed information) about four portions of the area represented by the tile 202. Information about the smaller portions of the area may be further subdivided into sixteen third level tiles 222, 224, 226, 228, 232, 234, 236, 238, 242, 244, 246, 248, 252, 254, 256, 258. Information about the portion of the area corresponding to the tile 212 may be subdivided into tiles 222, 224, 226, 228. Information about the portion of the area corresponding to the tile 214 may be subdivided into tiles 232, 234, 236, 238. Information about the portion of the area corresponding to the tile 216 may be subdivided into tiles 242, 244, 246, 248. Information about the portion of the area corresponding to the tile 218 may be subdivided into tiles 252, 254, 256, 258. The third level tiles may represent base tiles. The third level tiles may not be further sub-divided, and may be associated with underlying data for the portion of the area corresponding to the tiles 222, 224, 226, 228, 232, 234, 236, 238, 242, 244, 246, 248, 252, 254, 256, 258.

Information for the tile 202 may be recursively determined based on the information in the sub-tiles of the tile 202. For example, based on an information request, the tile 202 may be checked to see if it includes precomputed information responsive to the request. Based on the tile 202 not including the precomputed information, the responsive information for the tile 202 may be determined based on information sub-divided into the tiles 212, 214, 216, 218. The tiles 212, 214, 216, 218 may be checked to see if they include precomputed information responsive to the request. Based on one or more of the tiles 212, 214, 216, 218 not including the precomputed information, the responsive information for the given tile(s) may be determined based on information sub-divided into the respective sub-tiles. The tiles 222, 224, 226, 228, 232, 234, 236, 238, 242, 244, 246, 248, 252, 254, 256, 258 may be checked to see if they include precomputed information responsive to the request. Based on one or more of the tiles 222, 224, 226, 228, 232, 234, 236, 238, 242, 244, 246, 248, 252, 254, 256, 258 not including the precomputed information, the responsive information may be determined based on the underlying data associated with the given tile(s) (e.g., information within a database that corresponds to the latitude and longitude of the respective tile(s). The determined information may be stored within individual tiles as precomputed information.

Information for tile 202 may also be precomputed rather than recursively generated in response to an information request. The system may automatically merge two or more of the tiles 212, 214, 216, 218 before any user submits an information request. In some embodiments, recursive top-down approaches may compute and cache tile requests on the fly in response to information requests, whereas bottom-up merging may pre-generate tiles for future use. In some embodiments, these techniques may be combined to balance between processing cost of precomputation and latency cost of recursion. Various embodiments of the system may also use different strategies for maintaining fast information response times while minimizing resource utilization.

Figure 2B:
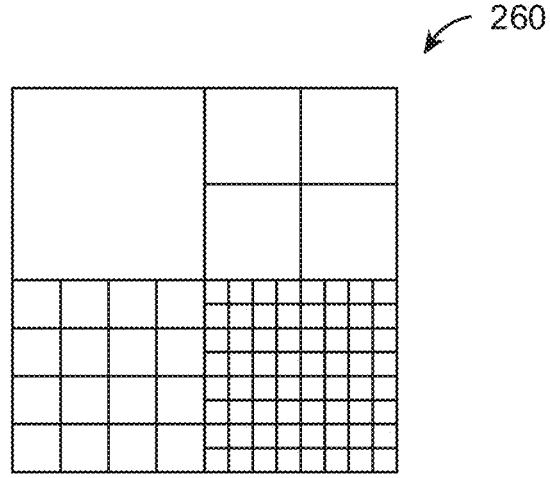

FIG. 2B illustrates an example representation 260 of tiled data, in accordance with various embodiments. The representation 260 may include five levels of tiles. The first level of tiles may include the largest square (the outer square). The largest square tile may correspond to an area (e.g., geographical area) and may include information (e.g., cached precomputed information) about the area. The information about the area may be subdivided into four smaller square tiles (one of which is shown in the upper left). The information of the four square tiles may be further subdivided into sixteen smaller square tiles (four of which are shown in the upper right). The information of the sixteen smaller square tiles may be further subdivided into sixty-four smaller square tiles (sixteen of which are shown in the lower left). The information of the sixty-four smaller square tiles may be further subdivided into two-hundred and fifty-six smaller square tiles (sixty-four of which are shown in the lower right). Thus, smaller squares may represent smaller portions of the geographical area. Use of smaller tiles for computation may result in more accurate information (as cached information represents information for smaller geographical area) than the use of larger tiles for computation. Use of smaller tiles for computation may require more processing resources than the use of larger tiles for computation.

Figure 3:
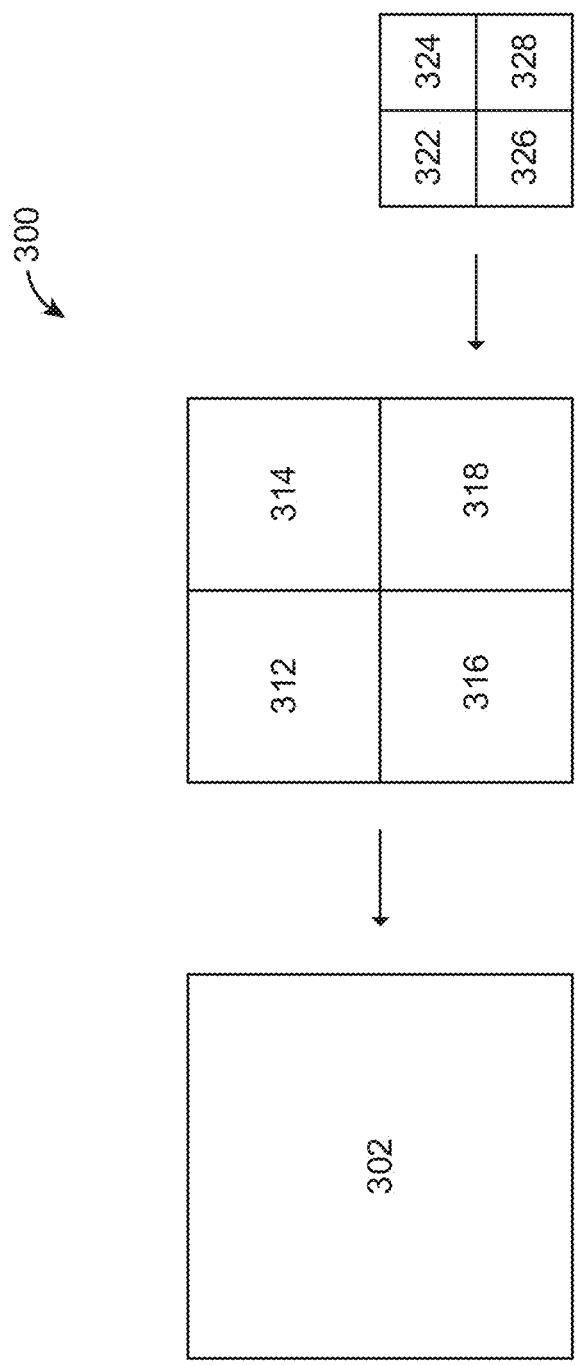
FIG. 3 illustrates an example process for determining a response to an information request based on precomputed information, in accordance with various embodiments.

FIG. 3 illustrates an example process for determining a response to an information request based on precomputed information, in accordance with various embodiments. Determining a response to an information request may require information for an area corresponding to a tile 302. The information for the area may be subdivided into tiles 312, 314, 316, 318. The information for the portion of the area corresponding to the tile 318 may be further subdivided into tiles 322, 324, 326, 328. The tiles 322, 324, 326, 328 may include base tile (not further subdivided, and associated with underlying data). The tile 302 may not include precomputed information responsive to the information request.

The responsive information for the tile 302 may be determined based on the information sub-divided into the tiles 312, 314, 316, 318. The tiles 312, 314, 316 may include precomputed information responsive to the information request. The tile 318 may not include precomputed information responsive to the information request. The responsive information for the tile 318 may be determined based on the information sub-divided into the tiles 322, 324, 326, 328. Thus, the information for the tile 302 may be recursively determined by (1) determining information for the tile 318 from the information included in the tiles 322, 324, 326, 328; and (2) determining information for the tile 302 from the information included in the tiles 312, 314, 316, 318. Recursively determining the information for the tile 302 enables determination and storage of the responsive information within the tile 302, as well as one or more of the sub-tiles 312, 314, 316, 318, 322, 324, 326, 328, and/or other sub-tiles.

Figure 4:
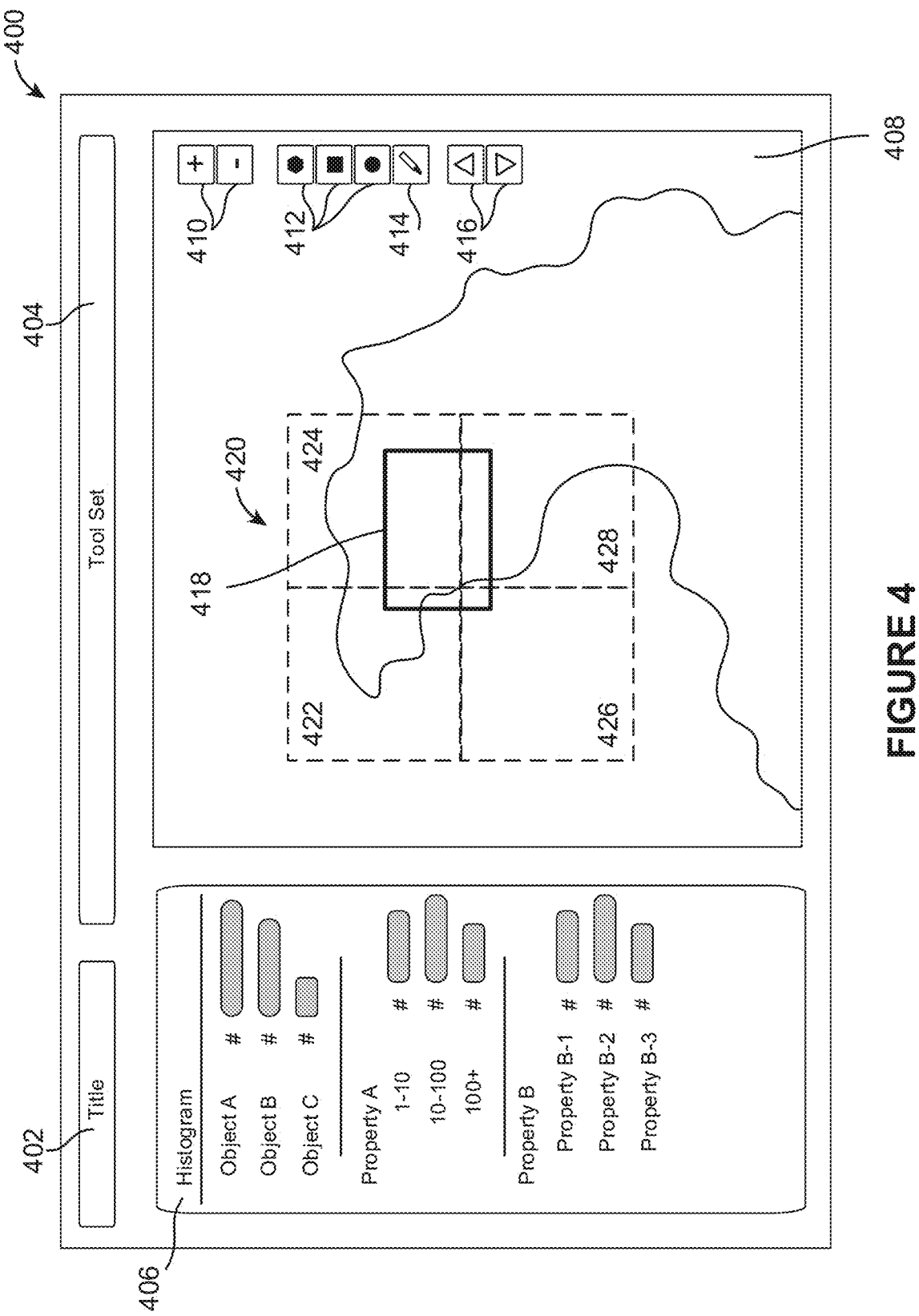
FIG. 4 illustrates an example interface for using tiled data, in accordance with various embodiments.

FIG. 4 illustrates an example user interface 400 for using tiled data, in accordance with various embodiments. In various embodiments, the user interface 400 may be accessed through a software application running on a computing device (e.g., computers, mobile phones, tablets, etc.) that includes one or more processors and memory. For example, the user interface 400 may be accessible through a web browser. In another example, the user interface 400 may be provided through a data analysis application. In yet another example, the user interface 400 may be provided as a service over a network (e.g., software as a service). Depending on the computing device, the user may be able to interact with the user interface 400 using various input devices (e.g., keyboard, mouse, etc.) and/or touch gestures. The user interface 400 is provided merely as an example and, naturally, the arrangement and configuration of such user interfaces can vary depending on the implementation. Thus, depending on the implementation, the user interface 400 may include additional features and/or alternative features.

The user interface 400 may include a title field 402, a tool set field 404, a histogram region 406, a display region 408, zoom options 410, selection options 412, 414, enhancement options 416, and/or other fields, regions, options. The title field 402 may display the title of the information (e.g., map type) being displayed in the user interface 400. The tool set field 404 may include one or more tools to use and/or change the information displayed in the user interface 400. For example, the tool set field 404 may include a search field that enables a user to search for particular features, data addition/removal field that enables a user to add/remove data from the map, export field that enables a user to export a given map/given display of a map, and/or other fields. The histogram region 406 may display one or more histograms relating to one or more areas selected within the display region 408. The display region 408 may display one or more portions of a map and/or other information. The display region 408 may display one or more particular information about the map (e.g., icons representing numbers/locations of particular objects within the map). The display region 408 may enable a user to select one or more portions of the map to request information about the selected area(s). For example, the display region 408 may enable a user to draw a bounding area to select a particular area shown on the map. The bounding area selection may select tiles entirely and/or partially within the bounding area. Other selections of areas/tiles are contemplated.

For example, a user may draw a bounding area 418 to select a tile 420 corresponding to an area shown within the dashed lines. The tile 420 may be subdivided into tiles 422, 424, 426, 428. The tiles within the same level of tiles may represent a uniform pixel area of the map. One or more of the tiles 422, 424, 426, 428 may include precomputed information that responds to the information request. One or more of the tiles 422, 424, 426, 428 may be further subdivided such that the sub-tiles includes a portion of the information of the individual tiles 422, 424, 426, 428. The precomputed information with the tiles (e.g., the tiles 420, 422, 424, 426, 428, other sub-tiles) may be used to provide information about the area corresponding to the tile 420. If a given tile does not include precomputed information, the responsive information may be recursively determined based on information included within sub-tiles of the given tile. In some embodiments, one or more tiles may include null data. For example, for an information request seeking a number of schools within the area corresponding to the tile 420, the tile 426 may include null data (e.g., because the tile 426 corresponds to a location over water). The tile 426 may point to a null data set rather than storing a null value.

A user may use one or more options 410, 412, 414, 416 to change the selection of the area and/or the level of tiles used for information computation. For example, a user may use the zoom option 410 to change (e.g., increase, decrease) the level of zoom for the map/information displayed within the display region 408. Zoom levels may correspond to particular levels of tiles used for information computation. For example, increasing the zoom level (more magnified view of the map) may enable a user to select sub-tiles of the tiles 422, 424, 426, 428. In some embodiments, the level of tiles used to compute information may be different from the level of tiles shown in the display region 408. For example, while the display region 408 show the user selection of the bounding area 418 as corresponding to the tiles 422, 424, 426, 428, the response to the information request may be determined based on a different (e.g., lower) levels of tiles. The response to the information request may be determined recursively based on sub-tiles of the tiles 422, 424, 426, 428.

A user may use the selection options 412 to select the shape of the bounding area (e.g., the bounding area 418) used to select the area/tiles. A user may use the selection option 414 to manually draw the bounding area 418 (e.g., drawing a regular or irregular polygon). A user may use the enhancement options 416 to change the level of tiles used for computation. For example, a user may use the enhancement options 416 to shift up or down the level of tiles used for information computation. The user may use the enhancement option 416 to increase the accuracy of the response to information request (via using a tile level including smaller tiles) or to decrease the accuracy of the response to information request (via using a tile level including larger tiles).

Responsive to the user's selection of the bounding area 418, the histogram region 406 may display one or more histograms relating to the area selected within the tile 420. The histogram(s) may be generated based on one or more precomputed information for tiles 420, 422, 424, 426, 428 (and/or precomputed information for sub-tiles of the tiles 420, 422, 424, 426, 428). The histogram region 406 may display one or more statistical information regarding the number/frequency of certain objects/data/properties within the area corresponding to the tile 420. For example, the histogram region 406 may display information relating to numbers/frequency of objects and/or properties relating to the objects via numbers, ranges, and/or in other visual forms (e.g., bars of varying size). The histogram region 406 may display information selected by a user and/or information tied to a particular type of map/analysis.

In some embodiments, the histogram(s) may be generated after a user's selection of the bounding area 418, rather than while the user is selecting the bounding area 418. Generating the histogram during a user's selection of the bounding area 418 may result in consumption of processing resources to determine information for tiles that are not needed for the bounding area 418. For example, as a user is selecting the bounding area 418, the user's selection may momentarily cover undesired areas, such as the areas of the map below the tile 420. Generating histogram(s) during the user's selection of the bounding area 418 may result in consumption of processing resources to determine information within the undesired areas. Generating the histogram after the user's selection of the bounding area 418 (e.g., indicated by a user letting go of a mouse button, indicated by a user input affirming that the selection has been made) may reduce the processing load by computing information on only the tiles (e.g., the tiles 420, 422, 424, 426, 428) that are needed to respond to the information request.

Figure 5:
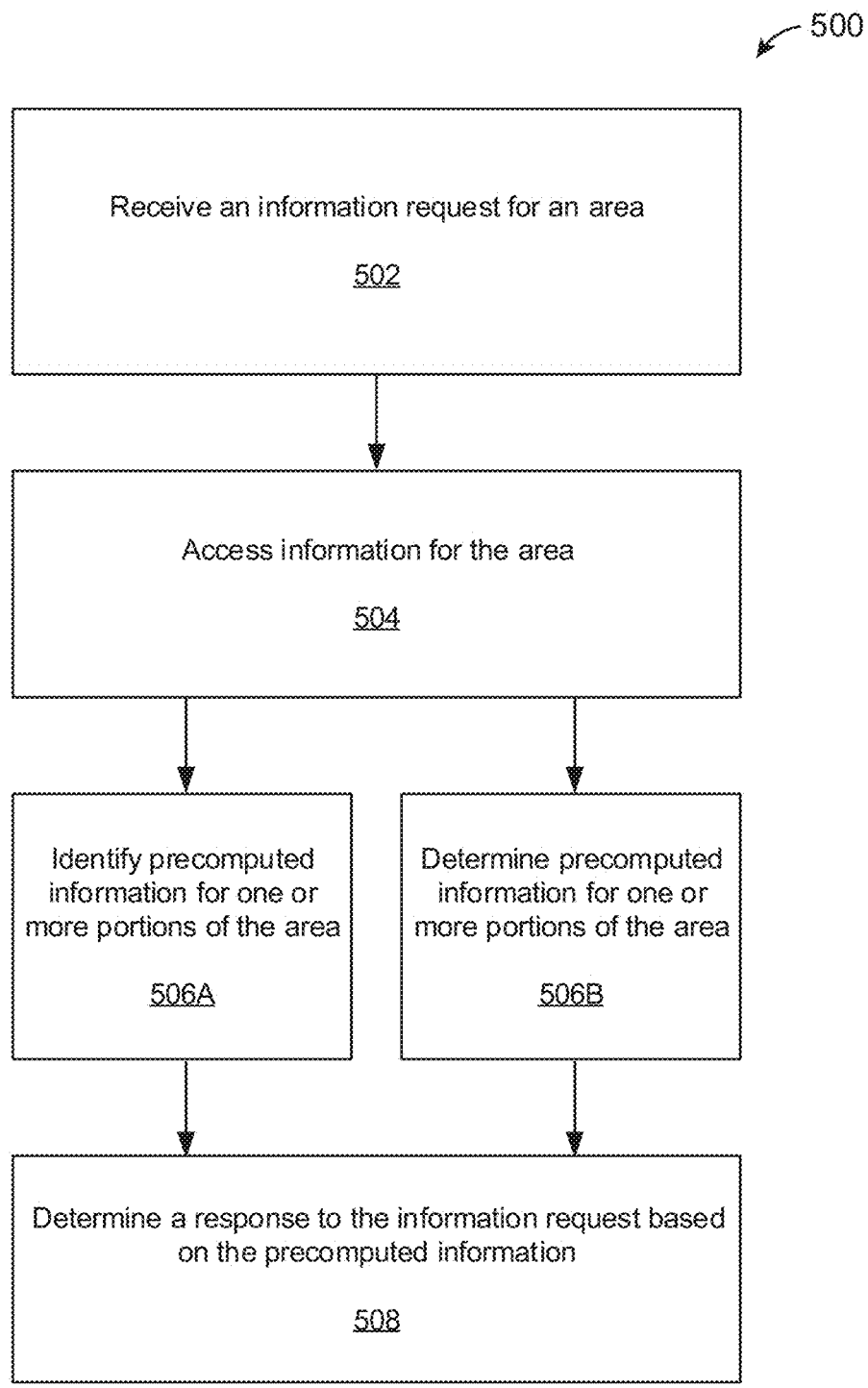
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, an information request for an area may be received. At block 504, information for the area may be accessed. The information may be stored in a tree structure such that the information is subdivided into one or more levels of tiles. One or more tiles may include precomputed information for one or more portions of the area corresponding to the tile(s). At block 506A, precomputed information for one or more portions of the area may be identified. At block 506B, precomputed information for one or more portions of the area may be determined (e.g., responsive information determined and cached as precomputed information). At block 508, a response to the information request may be determined based on the precomputed information.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
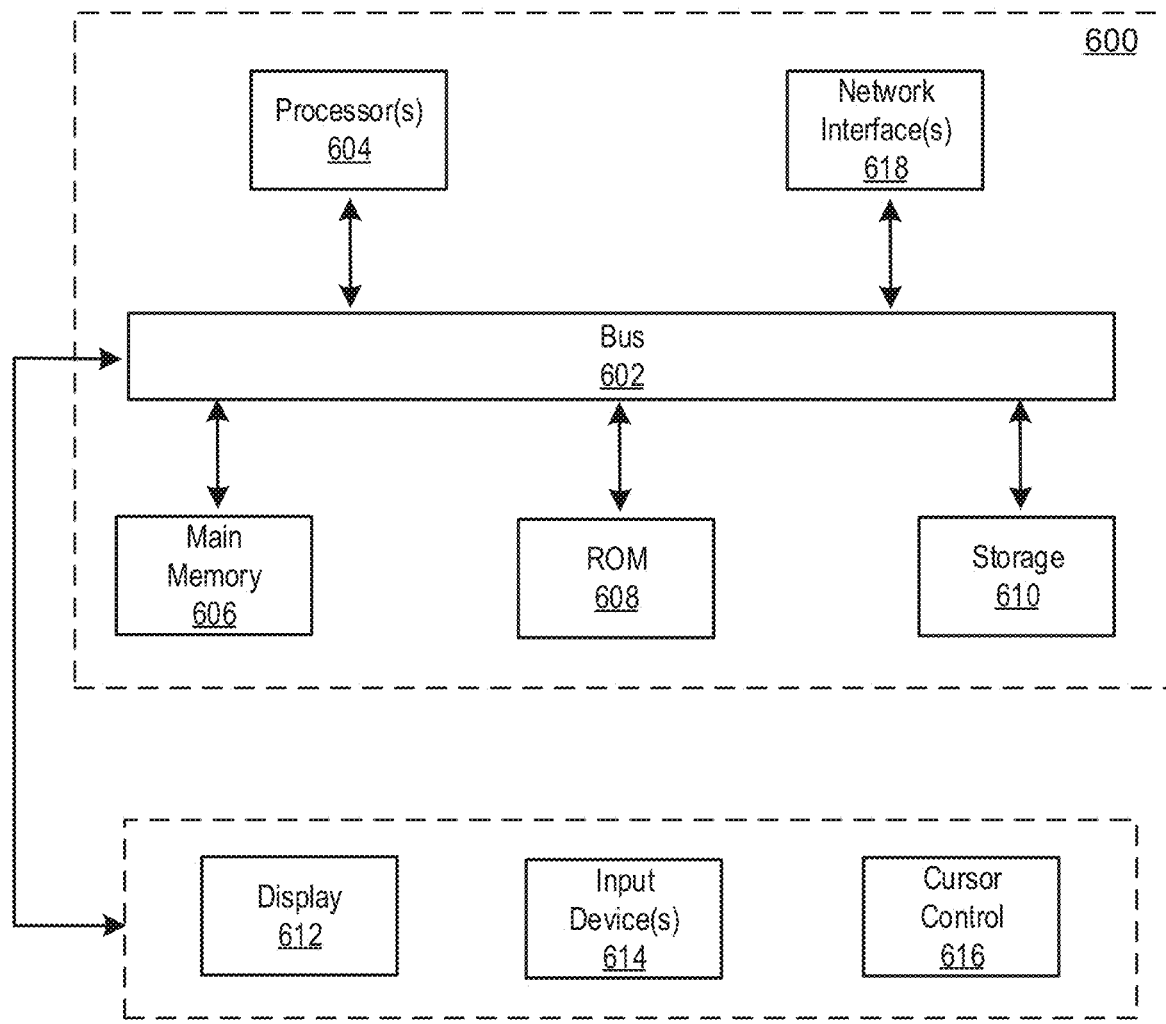
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hardwired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
memory storing instructions that, when executed by the one or more processors, cause the system to perform:
receiving an information request for a geographical area, the information request being associated with a particular type of analysis;
accessing information for the area, the information stored in a tree structure such that the information is subdivided into one or more levels of tiles, wherein one or more of the tiles include precomputed information for one or more portions of the area corresponding to the one or more of the tiles;
determining a response to the information request, the determining the response to the information request including:
determining that a first tile does not include first precomputed information for a first portion of the area corresponding to the first tile;
recursively determining the first precomputed information based on the information subdivided in sub-tiles of the first tile in response to determining that the first tile does not include the first precomputed information;
merging at least a portion of the precomputed information of the one or more tiles with the recursively determined first precomputed information, thereby updating the precomputed information for the one or more portions of the area corresponding to the one or more of the tiles;

caching the recursively determined first precomputed information based at least in part on a frequency of receipt of the information request;
determining that a particular sub-tile of the sub-tiles of the first tile includes null data for a portion of the area corresponding to the particular sub-tile;
associating a pointer with the particular sub-tile wherein the pointer points to a null data set that is shared with one or more other tiles or sub-tiles;
generating, in response to the merging at least a portion of the precomputed information of the one or more tiles with the recursively determined first precomputed information and based on the type of the analysis, a histogram for the area, the histogram presenting statistical information regarding one or more objects within the area; and
displaying, based on the recursively determined first precomputed information, an interface including at least one tile of the levels of tiles and the histogram.

2. The system of claim 1, wherein the information is subdivided based on a quadtree structure.

3. The system of claim 1, wherein the information request for the area is received through a user interface, the user interface enabling a user selection of at least one tile of the one or more tiles.

4. The system of claim 3, wherein the user interface further enables changes in zoom levels, individual zoom levels of the zoom levels corresponding to individual levels of tiles.

5. The system of claim 3, wherein a level of the one or more tiles used to determine the precomputed information responsive to the information request is different from a level of the one or more tiles corresponding to the user selection of one or more of the tiles corresponding to the area.

6. The system of claim 1, wherein the one or more tiles is a plurality of tiles, and wherein the system is further caused to perform:
determining that information within a second tile of the plurality of tiles has changed since the precomputed information was computed;
marking the second tile as a dirty tile; and
recursively rebuilding the plurality of tiles responsive at least in part to receiving the information request.

7. The system of claim 6, wherein the system is further caused to perform:
automatically rebuilding the second tile marked as the dirty tile based at least in part on a historical frequency of the information request.

8. The system of claim 1, wherein determining the response to the information request further comprises:
determining that the precomputed information of the one or more tiles is overlapping precomputed information that is not directly responsive to the information request; and
performing a logical analysis of the overlapping precomputed information to determine information that is directly responsive to the information request.

9. A method implemented by a computing system including one or more processors and storage media storing machine-readable instructions, wherein the method is performed using the one or more processors, the method comprising:
receiving an information request for a geographical area, the information request being associated with a particular type of analysis;
accessing information for the area, the information stored in a tree structure such that the information is subdivided into one or more levels of tiles, wherein one or more of the tiles include precomputed information for one or more portions of the area corresponding to the one or more of the tiles;
determining a response to the information request, the determining the response to the information request including:
determining that a first tile does not include first precomputed information for a first portion of the area corresponding to the first tile;
recursively determining the first precomputed information based on the information subdivided in sub-tiles of the first tile in response to determining that the first tile does not include the first precomputed information;
merging at least a portion of the precomputed information of the one or more tiles with the recursively determined first precomputed information, thereby updating the precomputed information for the one or more portions of the area corresponding to the one or more of the tiles;
caching the recursively determined first precomputed information based at least in part on a frequency of receipt of the information request;
determining that a particular sub-tile of the sub-tiles of the first tile includes null data for a portion of the area corresponding to the particular sub-tile;
associating a pointer with the particular sub-tile wherein the pointer points to a null data set that is shared with one or more other tiles or sub-tiles;
generating, in response to the merging at least a portion of the precomputed information of the one or more tiles with the recursively determined first precomputed information and based on the type of the analysis, a histogram for the area, the histogram presenting statistical information regarding one or more objects within the area; and
displaying, based on the recursively determined first precomputed information, an interface including at least one tile of the levels of tiles and the histogram.

10. The method of claim 9, wherein the information is subdivided based on a quadtree structure.

11. The method of claim 9, wherein the information request for the area is received through a user interface, the user interface enabling a user selection of at least one tile of the one or more tiles.

12. The method of claim 11, wherein the user interface further enables changes in zoom levels, individual zoom levels of the zoom levels corresponding to individual levels of tiles.

13. The method of claim 9, wherein the one or more tiles is a plurality of tiles, and wherein determining the response to the information request further comprises:
determining that information within a second tile of the plurality of tiles has changed since the precomputed information was computed;
marking the second tile as a dirty tile; and
recursively rebuilding the plurality of tiles responsive at least in part to receiving the information request.

14. The method of claim 13, further comprising automatically rebuilding the second tile marked as the dirty tile based at least in part on a historical frequency of the information request.

15. A non-transitory computer readable medium comprising instructions that, when executed, cause one or more processors to perform:
receiving an information request for a geographical area, the information request being associated with a particular type of analysis;
accessing information for the area, the information stored in a tree structure such that the information is subdivided into one or more levels of tiles, wherein a plurality of the tiles include precomputed information for a plurality of portions of the area corresponding to the plurality of the tiles;
determining a response to the information request, the determining the response to the information request including:
determining that a first tile of the plurality of the tiles does not include first precomputed information for a first portion of the area corresponding to the first tile;
recursively determining the first precomputed information based on the information subdivided in sub-tiles of the first tile in response to determining that the first tile does not include the first precomputed information;
merging at least a portion of the precomputed information of the plurality of tiles with the recursively determined first precomputed information, thereby updating the precomputed information for the plurality of portions of the area corresponding to the plurality of the tiles;
caching the recursively determined first precomputed information based at least in part on a frequency of receipt of the information request;
determining that information within a second tile of the plurality of the tiles has changed since the precomputed information was computed;
marking the second tile as a dirty tile;
recursively rebuilding the plurality of the tiles responsive at least in part to receiving the information request;
generating, in response to the merging at least a portion of the precomputed information of the plurality of the tiles with the recursively determined first precomputed information and based on the type of the analysis, a histogram for the area, the histogram presenting statistical information regarding one or more objects within the area; and
displaying, based on the recursively determined first precomputed information, an interface including at least one tile of the levels of tiles and the histogram.

16. The non-transitory computer readable medium of claim 15, wherein the information is subdivided based on a quadtree structure.

17. The non-transitory computer readable medium of claim 15, wherein the information request for the area is received through a user interface, the user interface enabling a user selection of at least one tile of the plurality of the tiles.

18. The non-transitory computer readable medium of claim 15, wherein determining the response to the information request further comprises:
determining that a particular sub-tile of the sub-tiles of the first tile includes null data for a portion of the area corresponding to the particular sub-tile; and
associating a pointer with the particular sub-tile wherein the pointer points to a null data set that is shared with one or more other tiles or sub-tiles.

* * * * *